(12) United States Patent
Chou

(10) Patent No.: US 9,810,579 B1
(45) Date of Patent: Nov. 7, 2017

(54) HUMAN BODY DETECTING DEVICE

(71) Applicant: CAL-COMP BIG DATA, INC., New Taipei (TW)

(72) Inventor: Yi-Wen Chou, New Taipei (TW)

(73) Assignee: Cal-Comp Big Data, Inc., New Taipei (TW)

( * ) Notice: Subject to any disclaimer, the term of this patent is extended or adjusted under 35 U.S.C. 154(b) by 0 days.

(21) Appl. No.: 15/442,037

(22) Filed: Feb. 24, 2017

(30) Foreign Application Priority Data

Nov. 17, 2016 (CN) ...................... 2016 2 1233572 U

(51) Int. Cl.
*G01J 5/06* (2006.01)
*G01J 5/00* (2006.01)
*G01J 5/34* (2006.01)

(52) U.S. Cl.
CPC .............. *G01J 5/06* (2013.01); *G01J 5/0025* (2013.01); *G01J 5/34* (2013.01); *G01J 2005/068* (2013.01)

(58) Field of Classification Search
CPC .... G08B 13/191; G08B 29/183; G08B 29/24; G01D 3/0365
USPC .................................................. 250/339.04
See application file for complete search history.

(56) References Cited

U.S. PATENT DOCUMENTS

| 5,629,676 A * | 5/1997 | Kartoun | G08B 13/19 250/DIG. 1 |
| 6,288,395 B1 * | 9/2001 | Kuhnly | G08B 29/26 250/252.1 |
| 6,791,087 B1 * | 9/2004 | Okumura | G01D 3/0365 250/342 |
| 9,377,361 B2 * | 6/2016 | Nabata | G01J 5/047 |

* cited by examiner

*Primary Examiner* — Kenneth J Malkowski
(74) *Attorney, Agent, or Firm* — Muncy, Geissler, Olds & Lowe, P.C.

(57) ABSTRACT

A human body detecting device includes a pyroelectric infrared radial (PIR) sensor, a thermometer, a processor, an amplifying unit, and a plurality of amplification adjusting units. The PIR sensor is configured to sense infrared radiation and then generate an electronic signal. The thermometer is configured to sense an ambient temperature and then generate a temperature value. The microprocessor is electrically connected to the thermometer, and the amplifying unit is electrically connected to the pyroelectric infrared radial sensor and the microprocessor. The amplification adjusting units corresponding to a plurality of temperature intervals are electrically connected to the microprocessor and the amplifying unit. The microprocessor selects to enable one of the amplification adjusting units based on a comparison between the temperature value and the temperature intervals, such that the amplifying unit may modulate the electrical signal according to the enabled amplification adjusting unit.

9 Claims, 2 Drawing Sheets

HUMAN BODY DETECTING DEVICE

BACKGROUND

Technical Field

The present disclosure relates to non-contact measuring device. More particularly, the present disclosure relates to human body detecting device.

Description of Related Art

Infrared radiation is an invisible radiant energy, electromagnetic radiation with longer wavelengths than those of visible light, extending from the nominal red edge of the visible spectrum at 0.7 micrometers to 1000 micrometers. Below infrared is the microwave portion of the electromagnetic spectrum. All matter with a temperature greater than absolute zero (−273K) emits infrared radiation, and the temperature determines the wavelength distribution of the infrared radiation. As shown in FIG. 1, the wavelength of the infrared radiation is decreased when the temperature increases.

A pyroelectric infrared radial (PIR) sensor is a non-contact measuring device configured to react to an infrared radiation having a wavelength of about 10 μm emitted from a human body, and may be formed using a lead zirconate titanate (PZT)-based material and a lithium tantalite (LiTaO$_3$)-based material. Basically, in the PIR sensor, the surface is always charged through spontaneous polarization, but the surface is neutralized by ions in air in a thermal equilibrium state, and thus output is not generated. At this time, when infrared radiation emitted from a human body is incident to the PIR sensor, a temperature near a surface of the PIR sensor is increased, and thus the equilibrium state is broken, and an electronic signal in response to the temperature variation. This is referred to a pyroelectricity effect, and the PIR sensor may detect a human body through the pyroelectricity effect.

In general, the PIR sensor may sense infrared radiation at any wavelength; however, it is well known in the art to employ PIR sensor in automation fields, security fields, illumination systems, guest saluting apparatuses, infrared radiation spectrometers, and radiation detectors to measure the temperature of human body moving through the field of view of the PIR sensor; therefore, the commercial PIR sensor adapts a filter within the optical route to filter out short wavelengths of the sunlight and fluorescent light.

In humans, the average internal temperature is 36~37.0° C., and emits infrared radiation in the range approximately 8-12 μm. Therefore, the filter may be selected to have 70% optical transmittance for wavelengths of 8-12 μm for employing in measuring infrared radiation of human body.

The PIR sensor is a passivate infrared radiation sensor, and has advantage of compact, low power and inexpensive. However, such sensor is not well-suited for use in the environment which the temperature is close to that of human body (such as in summer day). Under the condition aforementioned, the electronic signals generated by the PIR sensor are low and which may make the PIR sensor not to work properly.

SUMMARY

According to one aspect of the present disclosure, a human body detecting device includes a pyroelectric infrared radial (PIR) sensor, a thermometer, a processor, an amplifying unit, and a plurality of amplification adjusting units. The PIR sensor is configured to sense infrared radiation and then generate an electronic signal. The thermometer is configured to sense an ambient temperature and then generate a temperature value. The microprocessor is electrically connected to the thermometer, and the amplifying unit is electrically connected to the PIR sensor and the microprocessor. The amplification adjusting units corresponding to a plurality of temperature intervals are electrically connected to the microprocessor and the amplifying unit. The microprocessor selects to enable one of the amplification adjusting units based on a comparison between the temperature value and the temperature intervals, whereby the amplifying unit may modulate the electrical signal according to the enabled amplification adjusting unit.

In an embodiment of the present disclosure, the amplifying unit may include a signal amplifier and a voltage-dividing resistor, the signal amplifier is electrically connected to the PIR sensor and the microprocessor, the voltage-dividing resistor is electrically connected to the signal amplifier and the amplification adjusting units.

In an embodiment of the present disclosure, each amplification adjusting unit may include a resistor connected to the signal amplifier and a switch arranged between the resistor and ground, and an enabling end of the switch is connected to the microprocessor; when a resistance of the resistor in the enabled amplification adjusting unit is decreased, an amplification gain of the electronic signal and a capacitance of the capacitor in the enabled amplification adjusting unit increases.

In an embodiment of the present disclosure, each amplification adjusting unit may further include a capacitor arranged between the resistor and the switch and electrically connected thereto; the capacitor may be a high-pass filtering capacitor and configured to filter direct current (DC) signals.

In an embodiment of the present disclosure, the human body detecting device may further include a low-pass filtering capacitor electrically connected to the voltage-dividing resistor in parallel and configured to filter high-frequent noise.

In an embodiment of the present disclosure, the human body detecting device may further include a power decoupling capacitor electrically connected to the PIR sensor and the signal amplifier and configured to filter noise, whereby stable operation can be performed.

In an embodiment of the present disclosure, the human body detecting device further includes a static current controlling resistor electrically connected to the PIR sensor and the signal amplifier and configured to control the static current of the PIR sensor.

In an embodiment of the present disclosure, the microprocessor and the thermometer are communicated directly with each other via an Inter-Integrated Circuit (I$^2$C) bus communication protocol.

In an embodiment of the present disclosure, the human body detecting device is configured to detecting infrared radiation radiate from human body, and when a difference between the human temperature and ambient temperature is decreased, an amplification gain of the electronic signal increases.

In an embodiment of the present disclosure, the amplification adjusting units are electrically connected in parallel.

In an embodiment of the present disclosure, the switch is an N-type bipolar transistor; the base of the switch is connected to the microprocessor, the collector thereof is connected to the resistor, and the emitter thereof is connected to ground.

According to one aspect of the present disclosure, the human body detecting device includes multiple amplification adjusting units, and the microprocessor may select to enable one of the amplification adjusting units based on the ambient temperature, thus the problem which the PIR sensor not work properly is overcome.

BRIEF DESCRIPTION OF DRAWING

The present disclosure can be more fully understood by reading the following detailed description of the embodiment, with reference made to the accompanying drawings as follows.

DETAILED DESCRIPTION

A human body detecting device of the present disclosure includes a pyroelectric infrared radial (PIR) sensor, a thermometer, a processor, an amplifying unit, and a plurality of amplification adjusting units. The microprocessor selects to enable one of the amplification adjusting units, such that the amplifying unit may adjust an amplification gain of an electrical signal detected by the PIR sensor according to the enabled amplification adjusting unit.

Figure 1:
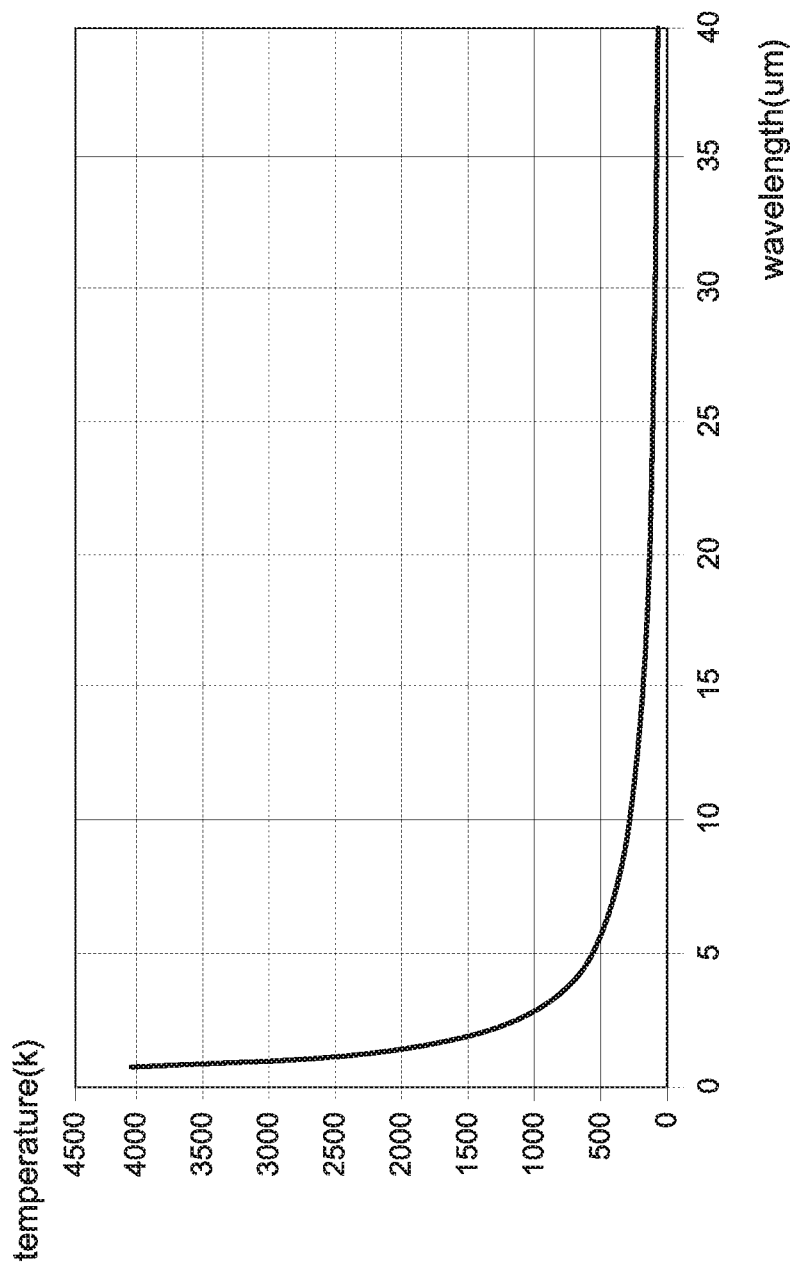
FIG. 1 is an exemplary diagram showing the temperature sensitivity of an infrared spectrum.
Figure 2:
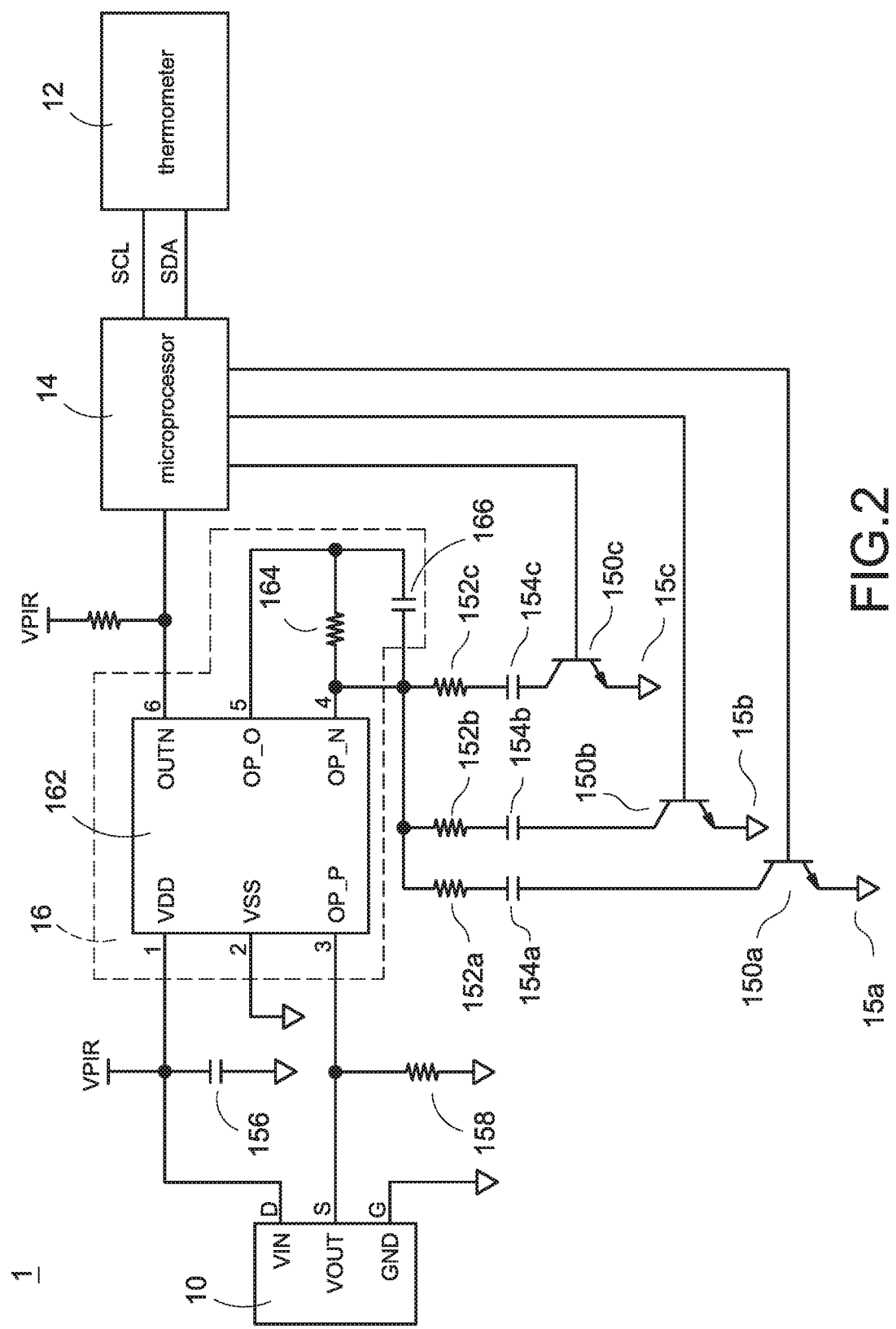
FIG. 2 is a circuit diagram of a human body detecting device according to the present disclosure.

More particularly, each amplification adjusting unit includes a switch and a resistor. The enabling end of the switch is connected to the microprocessor, and the resistor is arranged between the amplifying unit and non-enabling end of the switch. The amplification adjusting units are designed to heavily amplify the electronic signal when the resistance of the resistor in the enabled amplification adjusting unit is low, and to slight amplify the electronic signal when the resistance of the resistor in the enabled amplification adjusting unit is high. Each amplification adjusting unit further includes a capacitor arranged between the switch and the resistor and electrically connected thereto for filtering direct current (DC) signal, wherein in the amplification adjusting units, the capacitance of the capacitor is increased when the resistance of the resistor electrically connected to the capacitor decreases, therefore, the problem which the PIR sensor not work properly is overcome Reference is made to FIG. 2, which is a circuit diagram of a human body detecting device according to the present disclosure. In FIG. 2, the human body detecting device 1 includes a PIR sensor 10, a thermometer 12, a processor 14, an amplifying unit 16, and a plurality of amplification adjusting units. The PIR sensor 10 is configured to sense infrared radiation radiated from human body moving through the field of view of the PIR sensor 10 and then generate an electronic signal based on the sensed infrared radiation. The thermometer 12 is configured to sense an ambient temperature surrounding the PIR sensor 10 and then generate a temperature value. In particular, the thermometer 12 may sense the temperature in the field of view of the PIR sensor 10, and the thermometer 12 may be a thermocouple thermometer or a thermistor thermometer.

The microprocessor 14 and the thermometer 12 are communicated directly with each other via an Inter-Integrated Circuit (I$^2$C) bus communication protocol, wherein the I$^2$C bus includes a serial clock line SCL for transmitting a clock and a serial data line SDA for transmitting data in serial.

In the present disclosure, the human body detecting device 1 includes, for example, three amplification adjusting units (i.e., a first amplification adjusting unit 15a, a second amplification adjusting unit 15b, and a third amplification adjusting unit 15c shown in FIG. 2) electrically connected in parallel. The microprocessor 1 selects to enable one of the amplification adjusting units based on a comparison between the temperature value and the temperature intervals, whereby the amplifying unit 16 can amplify the electronic signal with an amplification gain of the selected amplification adjusting unit. In the present disclosure, the temperature interval corresponding to the first amplification adjusting unit 15a is lower than the temperature interval corresponding to the second amplification adjusting unit 15b, and the temperature interval corresponding to the second amplification adjusting unit 15b is lower than the temperature interval corresponding to the third amplification adjusting unit 15c.

The first amplification adjusting unit 15a includes a first switch 150a, a first resistor 152a, and a first capacitor 154a. The microprocessor 14 is connected to an enabling end of the first switch 150a, whereby the first switch 150a may turn on when receives an enable signal (with predetermined level) generated by the microprocessor 14. On the contrary, the first switch 150a may turn off when the first switch 150a does not receive the enable signal or receives the enable signal without the predetermined level.

In FIG. 2, the first switch 150a is an N-type bipolar transistor, and an enabling end thereof is gate. The first switch 150a turns off when its base receives an enable signal with low level generated by the processor 14 or when its base does not receive the enable signal. On the contrary, the first switch 150a turns on when its base receives an enable signal with high level, thereby the signal amplifier 15 may amplify the electronic signal generated by the PIR sensor 10 with an amplification gain in response to the first amplification adjusting unit 15a.

The collector of the first switch 150a is electrically connected to the inverting input OP_N of the signal amplifier 162, the voltage dividing resistor 164, and the low-pass filtering capacitor 166 via the first capacitor 154a and the first resistor 152a in sequence. The emitter of the first switch 150a is connected to ground. The first capacitor 154a may be a high-pass filtering capacitor and configured to filter direct current (DC) signals. The voltage dividing resistor 164 is electrically connected to the low-pass filtering capacitor 166 in parallel.

The second amplification adjusting unit 15b includes a second switch 150b, a second resistor 152b, and a second capacitor 154b; in FIG. 2, the second switch 150b is an N-type bipolar transistor, and an enabling end of the second switch 150b (i.e., the base of the second switch 150b) is connected to the microprocessor 14. The second switch 150b may turn on or off according to levels of enable signals generated by the microprocessor 14. The collector of the second switch 150b is electrically connected to the inverting input OP_N of the signal amplifier 162, the voltage dividing resistor 164, and the low-pass filtering capacitor 166 via the second capacitor 154b and the second resistor 152b in sequence. The emitter of the second switch 150b is electrically connected to ground. The second switch 150b turns on when the enable signal with high level enters its base, so that the signal amplifier may amplify the electronic signal generated by the PIR sensor 10 with the amplification gain in response to the enabled second amplification adjusting unit 15b. The second capacitor 154b may be a high-pass capacitor and configured to filtering DC signals.

The third amplification adjusting unit 15c includes a third switch 150c, a third resistor 152c, and a third capacitor 154c; in FIG. 2, the third switch 150c is an N-type bipolar transistor, and its enabling end thereof (i.e., the base of the third switch 150c) is connected to the microprocessor 14. The third switch 150c may turn on or off according to levels of enable signals generated by the microprocessor 14. The collector of the third switch 150c is electrically connected to the inverting input OP_N of the signal amplifier 162, the voltage dividing resistor 164, and the low-pass filtering capacitor 166 via the second capacitor 154b and the second resistor 152b in sequence. The emitter of the third switch 150c is electrically connected to ground. The third switch 150c turns on when the enable signal with high level enters its base, so that the signal amplifier may amplify the electronic signal generated by the PIR sensor 10 with the amplification gain in response to the enabled third amplification adjusting unit 15c. The third capacitor 154c may be a high-pass capacitor and configured to filtering DC signals.

In the present disclosure, the amplification factor of the first amplification adjusting unit 15a is smaller than that of the second amplification adjusting unit 15b, and the amplification gain of the third amplification adjusting unit 15c is smaller than that of the second amplification adjusting unit 15b. In the other words, when the amplification factor of the first amplification adjusting unit 15a is A1, the amplification factor of the second amplification adjusting unit 15b is A2, the amplification factor of the third amplification adjusting unit 15c is A3, and the following condition is satisfied:

$$A1<A2<A3.$$

Accordingly, when a resistance of the first resistor 152a is R1, a resistance of the second resistor 152b is R2, a resistance of the third resistor 152c is R3, a capacitance of the first capacitor 154a is C1, a capacitance of the second capacitor 154b is C2, and a capacitance of the third capacitor 154c is C3, the following condition are satisfied:

$$R1>R2>R3; \text{ and}$$

$$C1<C2<C3.$$

In operation of the human body detecting device, the microprocessor 14 compares the temperature value generated by the thermometer 12 and the temperature intervals in response to the first to third amplification adjusting units 15a-15c, and then selects to enable one of the first, second and third amplification adjusting units 15a-15c based on a comparison result. For example, when the temperature value generated by the thermometer 12 is within the temperature interval corresponding to the first amplification adjusting unit 15a, the microprocessor 14 selects to enable the first switch 150a (i.e., the first switch 150a turns on, and the second switch 150b and the third switch 150c turn off), whereby the electronic signal is slightly amplified; on the contrary, when the temperature value generated by the thermometer 12 is within the temperature interval corresponding to the third amplification adjusting unit 15c, the microprocessor 14 selects to enable the third switch 150c (i.e., the first switch 150a and the second switch 150b turn off, and the third switch 150c turns on), whereby the electronic signal is heavily amplified.

The human body detecting device 1 further includes a power decoupling capacitor 156 and a static current controlling resistor 158. One terminal of the power decoupling capacitor 156 is electrically connected to power input VIN of the PIR sensor 10 and the positive power input VDD of the signal amplifier 162, and the other terminal thereof is electrically connected to ground. The power decoupling capacitor 156 is configured to filter noise for making the signal amplifier 162 in a stable operation. The negative power input VSS of the signal amplifier 152 is electrically connected to ground. One terminal of the static current controlling resistor 158 is electrically connected to the power output VOUT of the PIR sensor 162, and the other terminal thereof is electrically connected to ground. The static current controlling resistor 158 is configured to control the static current of the PIR sensor 10. The power ground of the PIR sensor 10 is electrically connected to ground GND.

Although the present disclosure has been described with reference to the foregoing preferred embodiment, it will be understood that the disclosure is not limited to the details thereof. Various equivalent variations and modifications can still occur to those skilled in this art in view of the teachings of the present disclosure. Thus, all such variations and equivalent modifications are also embraced within the scope of the disclosure as defined in the appended claims.

What is claimed is:

1. A human body detecting device, comprising:
   a pyroelectric infrared radial (PIR) sensor configured to sense infrared radiation and then generate an electronic signal based on the sensed infrared radiation;
   a thermometer configured to sense an ambient temperature and then generate a temperature value;
   a microprocessor electrically connected to the thermometer;
   an amplifying unit electrically connected to the PIR sensor and the microprocessor; and
   a plurality of amplification adjusting units electrically connected to the microprocessor and the amplifying unit and corresponding to a plurality of temperature intervals, each amplification adjusting unit comprising:
     a switch, an enable end of the switch electrically connected to the microprocessor; and
     a resistor electrically connected to the signal amplifier, the switch, and the voltage-dividing resistor, wherein when a resistance of the resistor in the enabled amplification adjusting unit is decreased, an amplifier gain of the electronic signal increases,
   wherein the microprocessor selects to enable one of the amplification adjusting units based on a comparison between the temperature value and the temperature intervals, whereby the electrical signal is modulated by the amplifying unit according to the enabled amplification adjusting unit.

2. The human body detecting device in claim 1, wherein the amplifying unit comprises:
   a signal amplifier electrically connected to the PIR sensor and the microprocessor; and
   a voltage-dividing resistor electrically connected to the signal amplifier and the amplification adjusting units.

3. The human body detecting device in claim 2, wherein each of the amplification adjusting units further comprises a capacitor arranged between the resistor and the switch and electrically connected to the resistor and the capacitor, and when the resistance of the resistor in the enabled amplification adjusting unit is decreased, a capacitance of the capacitor increases.

4. The human body detecting device in claim 3, wherein the amplifier unit further comprises a low-pass filtering capacitor electrically connected to the voltage-dividing resistor in parallel.

5. The human body detecting device in claim 4, further comprising:
   a power decoupling capacitance electrically connected to the PIR sensor and the signal amplifier; and
   a static current controlling resistor electrically connected to the PIR sensor and the signal amplifier.

6. The human body detecting device in claim 5, wherein the microprocessor and the thermometer are communicated directly with each other via an Inter-Integrated Circuit ($I^2C$) bus communication protocol.

7. The human body detecting device in claim 1, wherein the human body detecting device is configured to detect infrared radiation from human body, and when a difference between a temperature of human body and the ambient temperature is decreased, an amplification gain of the electronic signal increases.

8. The human body detecting device in claim 1, wherein the amplification adjusting units are in a parallel connection.

9. The human body detecting device in claim 1, wherein the switch is an N-type bipolar transistor.

* * * * *